(12) United States Patent
Tajiri et al.

(10) Patent No.: US 10,563,936 B2
(45) Date of Patent: Feb. 18, 2020

(54) PASSIVE HEAT EXCHANGER VALVE

(71) Applicant: Unison Industries, LLC, Jacksonville, FL (US)

(72) Inventors: Gordon Tajiri, Allentown, PA (US); Michael Thomas Kenworthy, Beavercreek, OH (US); Yanzhe Yang, Mason, OH (US); Dattu GV Jonnalagadda, Andra Pradesh (IN)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 948 days.

(21) Appl. No.: 15/213,931

(22) Filed: Jul. 19, 2016

(65) Prior Publication Data

US 2018/0023906 A1 Jan. 25, 2018

(51) Int. Cl.
*F28F 27/02* (2006.01)
*F02C 3/04* (2006.01)
(Continued)

(52) U.S. Cl.
CPC .............. *F28F 27/02* (2013.01); *F01D 25/12* (2013.01); *F02C 3/04* (2013.01); *F02C 7/14* (2013.01); *F02C 7/18* (2013.01); *F02C 7/185* (2013.01); *F02C 9/18* (2013.01); *F02K 3/115* (2013.01); *F16K 17/38* (2013.01); *F16K 31/002* (2013.01); *F16K 31/44* (2013.01); *F05D 2260/213* (2013.01); *F05D 2300/505* (2013.01); *Y02T 50/672* (2013.01); *Y02T 50/675* (2013.01)

(58) Field of Classification Search
CPC .. F28F 27/02; F01D 25/12; F02C 3/04; F02C 7/14; F02C 7/18; F02C 7/185; F02C 9/18; F02K 3/115; F16K 17/38; F16K 31/002; F16K 31/44; F05D 2260/213; F05D 2300/505
USPC ............................................................ 60/805
See application file for complete search history.

(56) References Cited

U.S. PATENT DOCUMENTS 4,570,851 A 2/1986 Cirillo
6,485,255 B1 * 11/2002 Care ....................... F01D 5/187
415/12
(Continued)

FOREIGN PATENT DOCUMENTS

CA 2 911 757 A1 5/2016
EP 2 490 333 A1 8/2012
(Continued)

OTHER PUBLICATIONS

Extended European Search Report and Opinion issued in connection with corresponding EP Application No. 17181829.7 dated Dec. 5, 2017.
(Continued)

*Primary Examiner* — Phutthiwat Wongwian
*Assistant Examiner* — Loren C Edwards
(74) *Attorney, Agent, or Firm* — McGarry Bair PC

(57) ABSTRACT

A valve and a heat exchanger apparatus for a gas turbine engine include a valve body having a valve seat and an actuation component including a plate formed from a set of metal layers and responsive to a change in at least one of a thermal condition and a pressure exerted thereon such that the plate moves and the valve moves between an opened and a closed position where a portion of the plate engages with the valve seat.

19 Claims, 19 Drawing Sheets

(51) Int. Cl.
*F02C 7/14* (2006.01)
*F02C 7/18* (2006.01)
*F02C 9/18* (2006.01)
*F16K 17/38* (2006.01)
*F16K 31/00* (2006.01)
*F16K 31/44* (2006.01)
*F01D 25/12* (2006.01)
*F02K 3/115* (2006.01)

(56) References Cited

U.S. PATENT DOCUMENTS

| | | | |
|---|---|---|---|
| 7,845,575 B2 | 12/2010 | Franconi | |
| 2005/0221147 A1* | 10/2005 | Shioya | F16K 31/004 |
| | | | 429/443 |
| 2010/0303687 A1 | 12/2010 | Blaga et al. | |
| 2015/0083367 A1* | 3/2015 | Diaz | F03G 7/065 |
| | | | 165/103 |

FOREIGN PATENT DOCUMENTS

| | | |
|---|---|---|
| GB | 577 025 A | 5/1946 |
| JP | 57002776 Y2 | 1/1982 |
| JP | 63139380 A | 11/1988 |
| JP | H06-221454 A | 8/1994 |
| JP | 2003-254457 A | 9/2003 |
| JP | 2016-090226 A | 5/2016 |

OTHER PUBLICATIONS

Office Action issued in connection with corresponding CA Application No. 2972452 dated Mar. 29, 2018.

Notification of reason for refusal issued in connection with corresponding JP Application No. 2017-134282 dated Jul. 31, 2018 (English Translation not available).

Office Action issued in connection with corresponding Japanese Application No. 2017-134282 dated Mar. 19, 2019, 12 pages.

* cited by examiner

PASSIVE HEAT EXCHANGER VALVE

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be arranged in a ring about a portion of the engine.

Oil can be used to dissipate heat from engine components, such as engine bearings, electrical generators, and the like. Heat is typically rejected from the oil to air by air-cooled oil coolers, and more particularly, surface air-cooled oil cooler systems to maintain oil temperatures at a desired range from approximately 100° F. to 300° F. In many instances, an environment can be as low as −65° F. When this occurs, a bypass valve can be incorporated to allow a portion of the oil to bypass the air-cooled oil cooler and return to the engine without being cooled by the air-cooled oil cooler, if required.

Known bypass valves for use in air-cooled oil cooler systems of aviation engines typically include pressure-actuated valves that are responsive to a change in pressure, and combined pressure and thermally actuated valves that are responsive to a change in both pressure and temperature. Pressure actuated valves are well known in the art, but are not easily tunable. Pressure and thermally actuated valves are also known in the art and typically comprise a valve driven by dual springs and a thermal actuator. The thermal actuator is driven by volume change of a wax contained therein subject to a phase change from a solid to a liquid in response to an increase in temperature. Pressure and thermally actuated bypass valves, while providing a sufficient means for allowing a portion of the oil to return to the engine without being cooled, are unreliable due to sealing issues and the like. In this type of valve, the wax in liquid phase has a tendency to leak and therefore the reliability of the valve is typically lower than desired. In addition, the inclusion of dual springs results in a component of a weight and a cost that can be of issue.

BRIEF DESCRIPTION OF THE INVENTION

In one aspect, the present disclosure relates an aviation valve including a valve body having a valve seat and an actuation component including a plate formed from a set of metal layers responsive to a change in at least one of a thermal condition and a pressure exerted thereon such that the valve moves between an opened and a closed position where a portion of the plate engages with the valve seat.

In another aspect, the present disclosure relates to a heat exchanger apparatus for use in an oil cooling system of an aircraft engine including an air-cooled oil cooler disposed in a bypass fan duct of the aircraft engine and a valve, in fluid communication with the air-cooled oil cooler, the bypass valve including a valve body having a valve seat, and an actuation component including a plate formed from a set of metal layers and responsive to a change in at least one of a thermal condition and a pressure exerted thereon such that the plate moves and the valve moves between an opened and a closed position where a portion of the plate engages with the valve seat.

In yet another aspect, the present disclosure relates to a gas turbine engine including a core engine and a heat exchanger apparatus including an air-cooled oil cooler disposed in a bypass fan duct of an aircraft engine, and a bypass valve, in fluid communication with the air-cooled oil cooler, the bypass valve including a valve body having a valve seat and an actuation component including a plate formed from a set of metal layers and responsive to a change in at least one of a thermal condition and a pressure exerted thereon such that the plate moves and the valve moves between an opened and a closed position where a portion of the plate engages with the valve seat and wherein the valve is configured to provide a bypass for at least a portion of a hot engine oil directed toward the air-cooled oil cooler and direct it back to the core engine prior to reaching the air-cooled oil cooler.

DESCRIPTION OF EMBODIMENTS OF THE INVENTION

Embodiment disclosed herein relate to surface coolers and more particularly to a valve for a surface coolers in an engine such as an aircraft engine. The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, and water turbines.

Current surface air oil coolers use a complex and expensive thermo-valve to regulate and divert the flow of oil to the cooler bypass channels during cold oil conditions and function as a high-pressure relief valve. Such a dual-function design is accomplished with a thermally activated bellows with a separate compression coil spring. Many precision machined, welded, and assembled components are required for the current valve assembly. For example the can be a complex edge welded bellows that is filled and hermetically sealed with a temperature sensitive phase-changing paraffin wax. The current valve with its complex component and complex assembly has many opportunities for defects and long-term failures.

Figure 1:
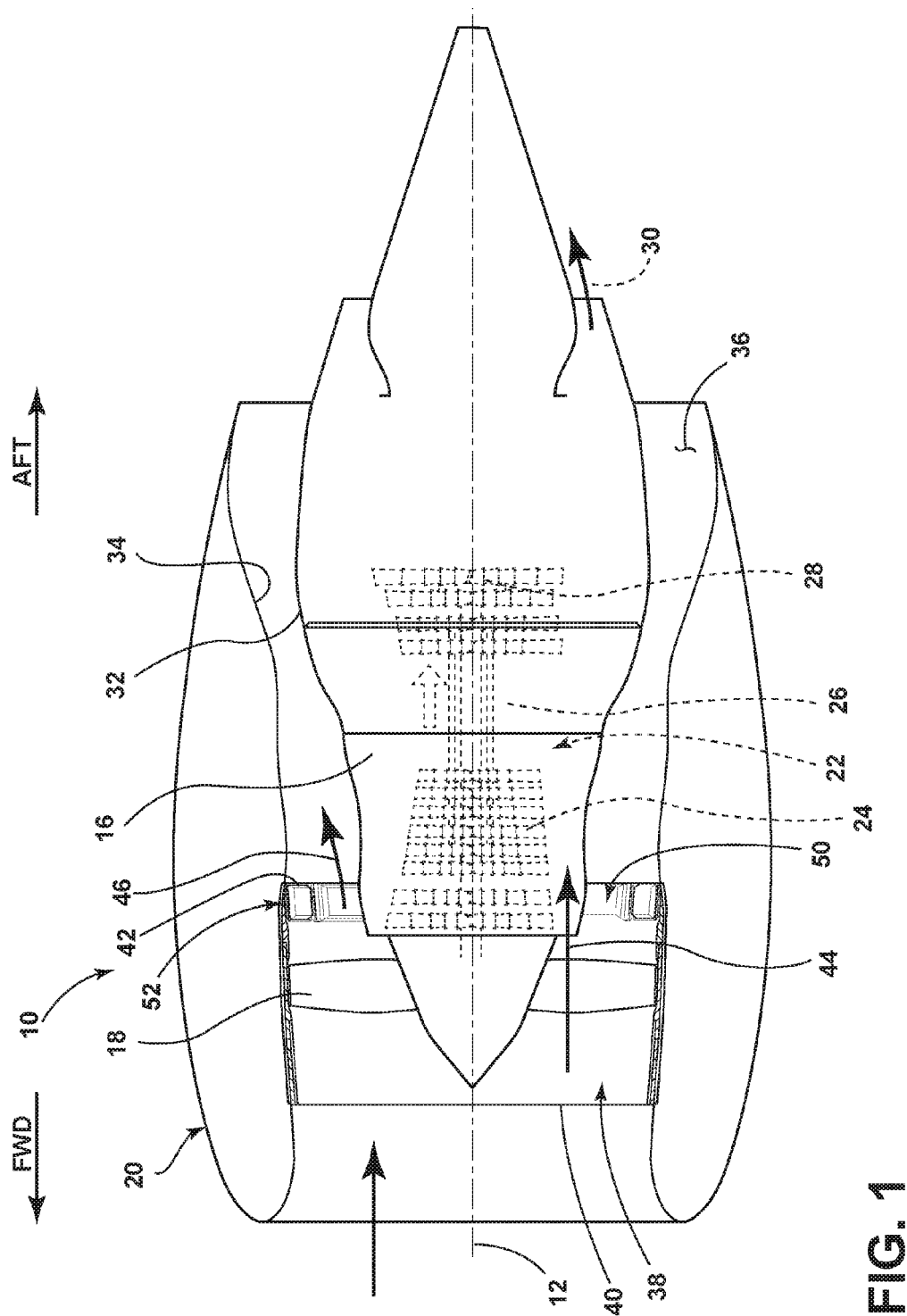
FIG. 1 is a schematic partially cut away view of a turbine engine assembly with a surface cooler and mounting system according to an embodiment of the invention.

Aspects of the present disclosure have a simplified design and will result in reduced defects and rework, thereby reducing overall cost. As the valve can be configured for use in an oil cooling system of an aircraft engine, FIG. 1 provides a brief explanation of the environment in which embodiments of the invention can be used is described. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor (s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing assembly 38 having an annular forward casing 40 and an aft casing 42 can form a portion of the outer cowl 34 formed by the nacelle 20 or can be suspended from portions of the nacelle 20 via struts (not shown).

In operation, air flows through the fan assembly 18 and a first portion 44 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 46 of the airflow discharged from fan assembly 18 around engine core 22.

Figure 2:
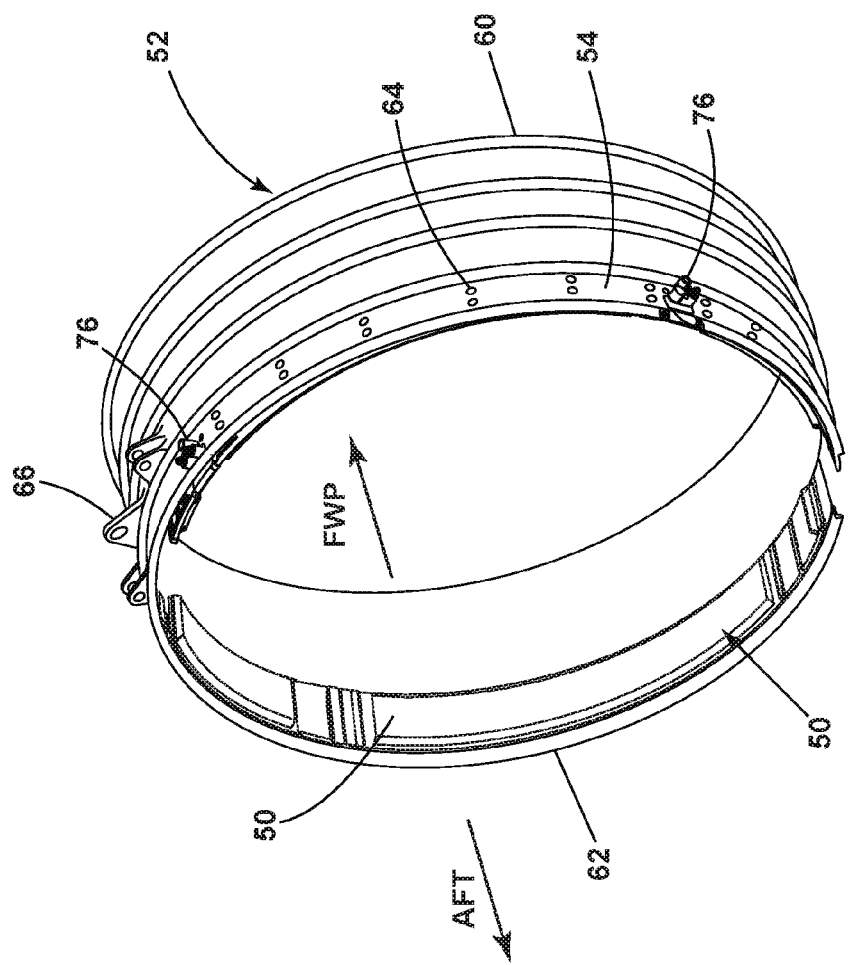
FIG. 2 is a perspective view of an aft portion of a casing, the surface cooler, and mounts that can be included in the turbine engine assembly of FIG. 1.

The turbine engine assembly 10 can pose unique thermal management challenges and a heat exchanger system or surface cooler 50 can be attached to the turbine engine assembly 10 to aid in the dissipation of heat. In the exemplary embodiment, the surface cooler 50 can be an annular fan surface cooler 50 that can be operably coupled to a casing 52 having a peripheral wall 54 (FIG. 2) that forms an interior portion of the outer cowl 34. The surface cooler 50 can be any suitable cooler including an air-cooled oil cooler. The casing 52, in non-limiting examples, can be the fan casing assembly 38, or the forward casing 40 or aft casing 42. It should be appreciated that the casing 52 can be any casing region, such that the casing encloses any structural hardware that is part of the annular duct defined by the casing assembly 52. Thus, the surface cooler 50 can couple to the casing 52 at any position along the duct defined by the casing assembly 38. FIG. 2 illustrates one exemplary embodiment of the casing 52 of the fan casing assembly 38 (FIG. 1). The surface cooler 50 can cover any portion of the peripheral wall 54, and is not limited to the size as illustrated. It will be understood that a set of surface coolers 50 can be utilized to cool a single turbine engine assembly 10. It will be understood that "a set" as used herein can include any number including only one. Such a set can be disposed in axial arrangement along the peripheral wall 54. The casing 52 includes a forward edge 60 and an opposing aft edge 62. Fan casing fastener openings 64 pass through the peripheral wall 54 as well as manifold openings 76. Multiple casing mounts 66 can mount along the exterior of the casing 52 for mounting the casing 52 to the outer cowl 34. Such casing mounts 66 can include, but are not limited to, clevis mounts.

The surface cooler 50 can include, but is not limited to, an air-cooled heat exchanger that is positioned on the casing 52. While the surface cooler 50 has been illustrated as being downstream of the fan assembly 18 it is also contemplated that the surface cooler 50 can alternatively be upstream from fan assembly 18, or at any position along the outer cowl 34. Further still, while not illustrated, the surface cooler 50 can be located adjacent the inner cowl 32. As such, it will be understood that the surface cooler 50 can be positioned anywhere along the axial length of the annular passage 36.

Figure 3:
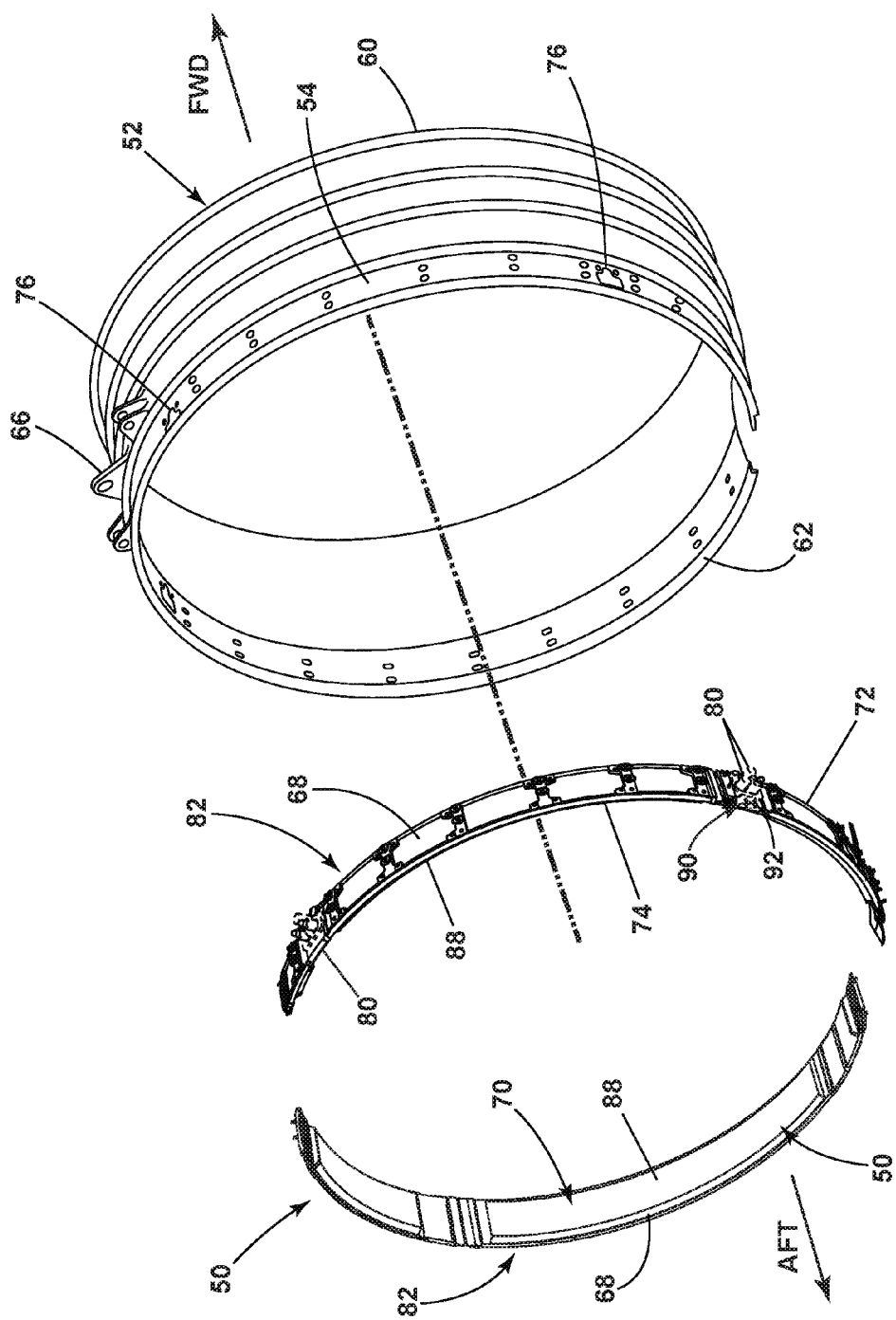
FIG. 3 is a partially exploded perspective view of the portion of the casing of FIG. 2 having two surface coolers exploded therefrom.

The partially exploded view of FIG. 3 illustrates the surface cooler 50 removed from the casing 52. The surface cooler 50 includes a first surface 56, which can confront the peripheral wall 54 at mounting. In the combined position, an inner surface 70 of the surface cooler 50 forms a portion of the outer cowl 34 (FIG. 1). The surface cooler 50 includes a forward edge 72 and an opposing aft edge 74. The surface cooler 50 can include a circumferential and axial annular shape that is substantially similar to the circumferential shape of the peripheral wall 54 facilitating mounting thereto.

The casing 52 further includes manifold openings 76 and the surface cooler includes a plurality of cooler manifolds 80 coupled to a body 68. The manifold openings 76 are adapted to align with and receive the cooler manifolds 80 mounted onto the surface cooler 50. The manifold openings 76 receive the cooler manifolds 80 radially through the casing 52 for receiving fluid provided to the surface cooler 50. While the surface cooler 50 is shown having two cooler manifolds 80 any number of cooler manifolds 80 are contemplated.

Two cooler portions 82 can define the complete annular fan surface cooler 50. The cooler portions 82 can couple to form the substantially annular surface cooler 50. A set of heat exchanger pads 88 mount along an inner surface 70 of the surface cooler 50. The cooler manifolds 80 can provide a flow of cooling fluid to the heat exchanger pads 88 for transferring heat away from the engine 10.

An avionics valve 90 having an actuator 92 can be included in the cooler manifold 80 and can configured to provide a bypass for at least a portion of a hot engine oil from the engine assembly 10 directed toward the surface cooler 50 and direct it back to the engine assembly 10 prior to reaching the surface cooler 50. The actuator 92 can be a plate in one example. The avionics valve 90 according to aspects of the present disclosure has a simplified design that includes a one or more thermally sensing multi-metallic plates that performs the two functions of thermal activation and pressure relief. By way of non-limiting example, a thermal activation bi-metal or multiple laminate flapper plate can be utilized as the actuator 92. Such an actuator 92 can be tuned by an appropriate coefficient of thermal expansion material selection and sizing of directly bonded metal sheets. Custom metal material tapes can also be utilized. The thermal activation of the bi-metal (or shape memory alloy) flapper plate can tuned by appropriate coefficient of thermal expansion material selection and sizing of directly bonded aluminum alloy and aluminum metal matrix composite (MMC), aluminum silicon carbide sheets (AlSiC).

Figure 4:
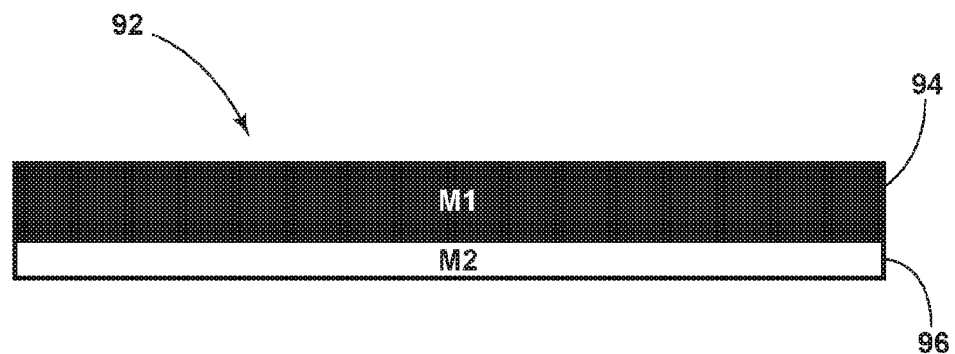
FIG. 4 is a schematic drawing of an actuation component that can be utilized in a valve in a surface cooler such as the surface cooler of FIG. 3.

Ultrasonic additive manufacturing (UAM) or other alternative metal bonding processes can be used to laminate the dissimilar materials to produce a monolithic laminate composite metal sheet, which is schematically illustrated in FIG. 4 as the actuator 92, having a first material M1 indicated at 94 and a second material M2 indicated at 96. The first and second materials can include, but are not limited to, a high strength aluminum alloy as M1 and AlSiC as M2. Any suitable materials can be utilized and such material selection creates the temperature dependent internal differential stain. In the above materials example, a bi-metal strip is formed from the layer of aluminum alloy and layer of AlSiC. The volume fraction percentage of silicon carbide (SiC) within the AlSiC can be varied to tune the coefficient of thermal expansion (CTE). Depending on the percentage of SiC, the CTE for AlSiC will vary from 20 to 7 ppm/C. This integrated actuation design improves the thermal response of the cooler to changing load conditions by reducing the transient delay and maximizing the thermal magnitude of actuation. Further still, binary and ternary Ni—Ti shape memory foils can be incorporated as an additional thermal actuation material or in conjunction with MMC foils. These alloys are designed to activate and change shape at specific tunable temperatures. Such shapes can be particularly created based upon the tuning of local percentages of the SiC throughout the actuator 92, for example, or other shape memory alloy materials. Additionally, other metal alloy and smart metal material tapes can be utilized.

The alloys and smart metals used can be 3D printed, such as using the UAM process, providing for low mass as well as being optimized for minimum hydraulic loss and maximum pressure vessel strength. The bi-metal strip can be used as a valve using the basic geometry of a tuned reed valve, with the addition of a poppet at a free end. Furthermore, the addition of complex 3D printed kinematic features is possible using a combination of in-situ machining, layered ultrasonic welding, and secondary laser welding.

Figure 5A:
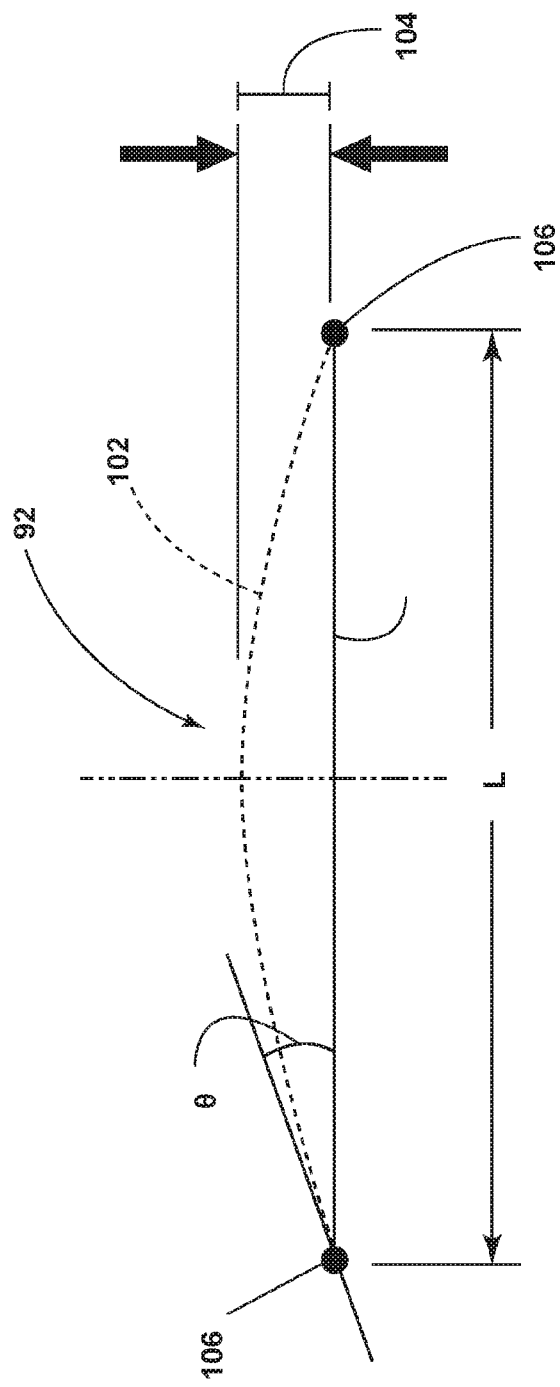
FIG. 5A is a schematic view illustrating an example of an approximate thermal deflection of the actuation component of FIG. 3.
Figure 5B:
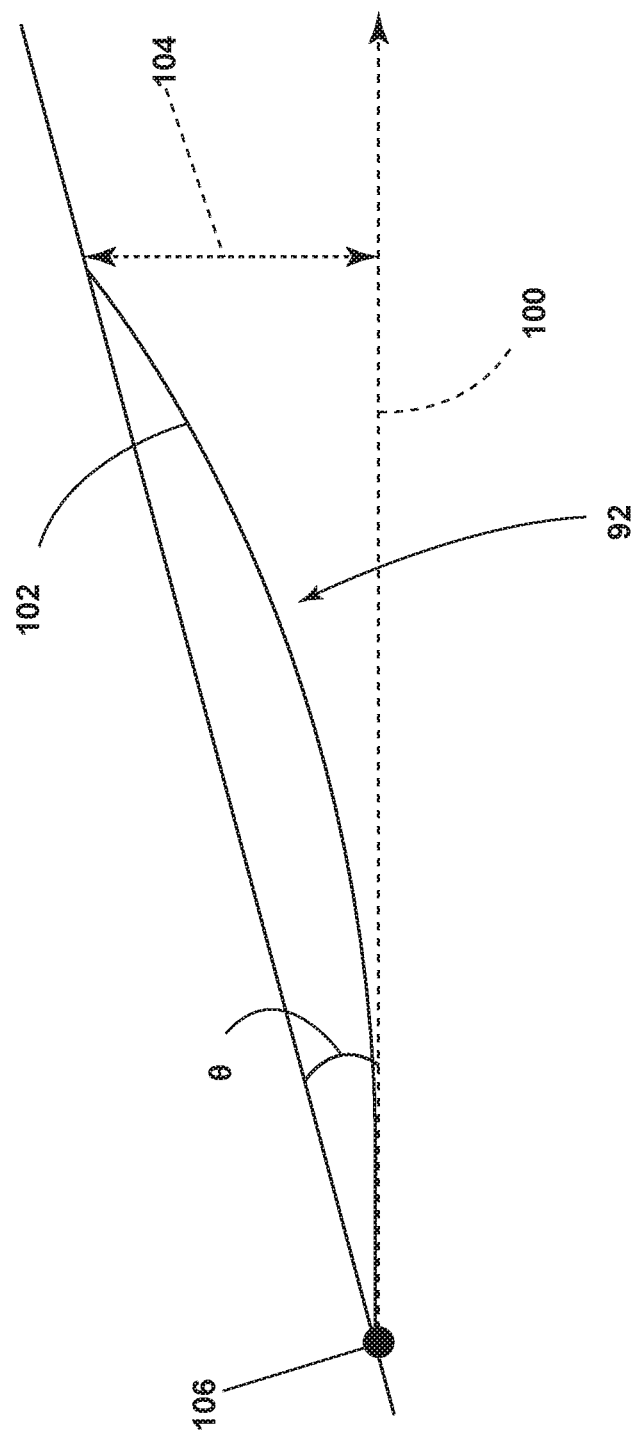
FIG. 5B is a schematic view illustrating an example of an approximate thermal deflection of the actuation component of FIG. 3 in a cantilevered configuration.

Referring now to FIGS. 5A and 5B, the actuation component 92 is configured as a linear member that extends or retracts according to the pre-memorized shape in parallel to the temperature change. In an initial position 100, the actuation component 92 can be linear, but can become arcuate in the extended position 102 after exposure to a temperature differential. The difference between the initial position 100 and the extended position 102 can be represented by a maximum deflection 104 and an angle of rotation θ, defining a radius of curvature for the actuation component 92 between two fixed ends or fixed points 106. The pressure activation and sizing can be accomplished using simple variable or uniform cross-section cantilever plate equations and finite element analysis simulations. Closed-form thermal-strain solutions for bi-metal plates were initially used to approximate thermal actuation deflections. In one non-limiting example, the radius of curvature can be represented by a variable cross-section cantilever beat equations, such as equation (1):

$$\rho = \frac{t\left[3(1+m) + (1+mn)\left(m^2 + \frac{1}{mn}\right)\right]}{6(\alpha_2 - \alpha_1)(T_h - T_c)(1+m)^2} \quad (1)$$

and the angle of rotation can be represented by equation (2):

$$\sin\theta = \frac{L}{2\rho} \quad (2)$$

where $\rho$ is the radius of curvature, t is the total thickness of the actuation component 92, m is the thickness ratio of first material 94 to the second material 96, n is the elastic modulus ratio between the two materials 94, 96, $\alpha_2$ is the second coefficient of thermal expansion, $\alpha_1$ is the first coefficient of thermal expansion, $T_h$ is the hot temperature, $T_c$ is the cool temperature, θ is the angle of rotation, and L is the length of the actuation component 92. Thus, in determining the radius of curvature $\rho$ and the angle of rotation θ, the maximum deflection 104 can be determined using equation (2) to determine the angle of rotation θ. Additionally, the angle of rotation θ can be tuned based upon the amount of SiC within the AlSiC layer.

In one particular, non-limiting example, the length of the actuation component 92 can be 2.0 inches, made of a combination of aluminum as M1 and AlSiC as M2 (FIG. 4). The AlSiC layer can be 63% SiC. At an initial reference temperature of 20 degree C., an 80 degree C. increase in temperature to 100 degrees C. can provide for a 0.10 inch deflection, defining a rate of deflection of 0.025 inches per 20 degrees. A maximum deflection, for example, can be 0.160 inches at a 130 degree C. change.

As shown in FIG. 5A, the maximum deflection 104 can be determined for a beam model having two first ends as fixed ends 106, with a second end in the center as a free end 108, free to move as defined by the maximum deflection 104. As shown in FIG. 5B, the maximum deflection 104 can be shown between the initial and extended positions 100, 102 for a cantilevered model, having only one fixed end 106 and the second, free end 108.

It should be appreciated that the actuation component 92 of the present disclosure allows for a one-piece, low profile, low-mass solution. The low-profile planar geometry can be combined with both out-of-plane translation and rotation. The low profile and low mass are important for airflow, drag, and fuel consumption. Depending on the complexity of the kinematic geometry, the actuation will be optimized for reduced hydraulic loss. The actuation component 92 fabrication process with in-situ precision machining increases design flexibility and supports custom non-standard poppet geometries for low hydraulic loss. A wedged poppet with geometrically matched and aligned with low-restriction inlet and outlet flow paths is possible.

Figure 6A:
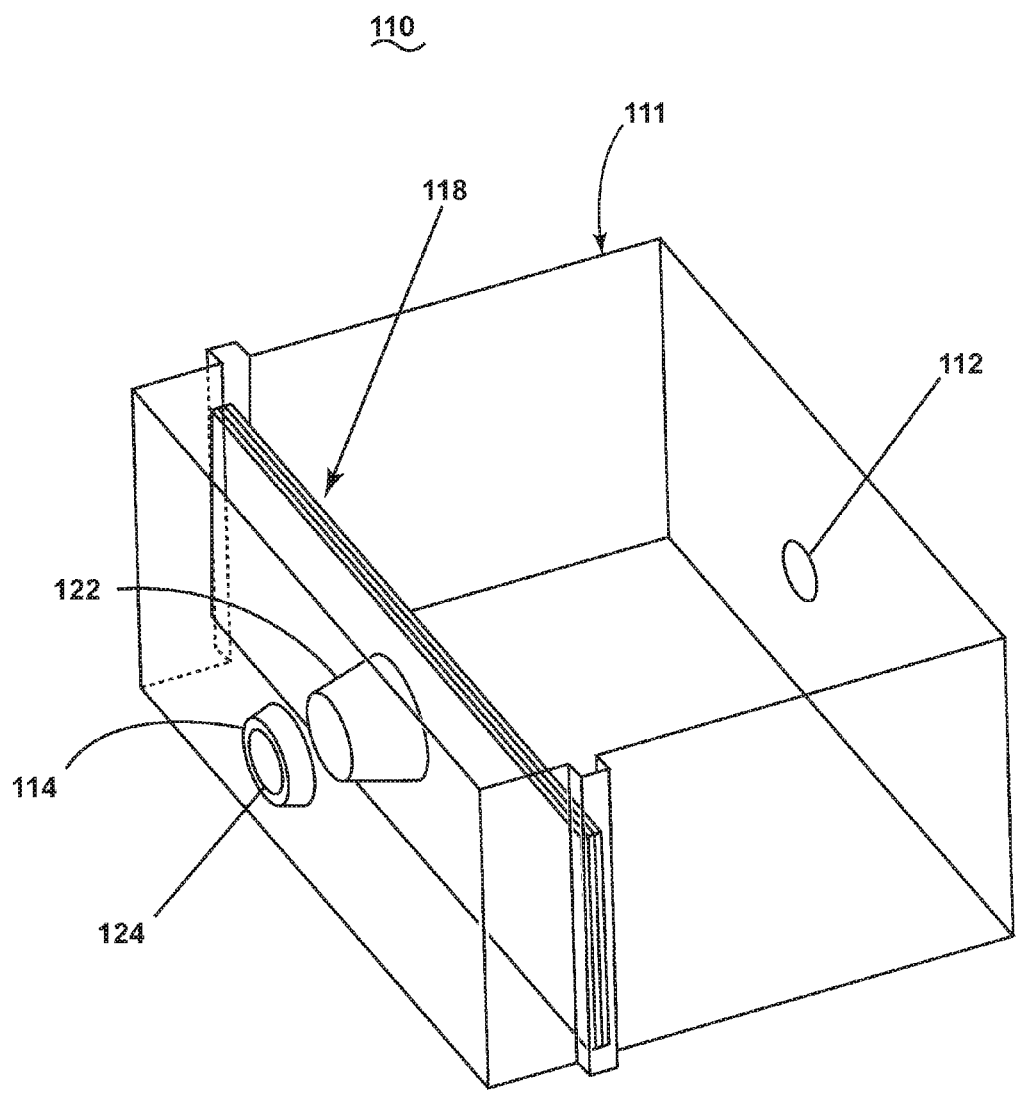
FIG. 6A is a perspective view of an exemplary valve that can be utilized in a surface cooler such as the surface cooler of FIG. 3 where the valve is in a first position.

By way of non-limiting example, FIG. 6A illustrates a schematic avionics bypass valve 110, which can be utilized in the surface cooler 50. The valve 110 includes a valve body 111 having an inlet port 112 and an outlet port 114. The valve 110 provides for flow control of the hot engine oil passing there through. The valve 110 includes an actuation component 116 including a plate 118 formed from a set of metal layers responsive to a change in at least one of a thermal condition and a pressure exerted thereon. In the illustrated example, the plate 118 is composed of three different materials. Regardless of how many sets of metal layers are included, the plate 118 can be considered a monolithic composite metal sheet. It will be understood that the description of the actuation component 92 applies to the actuation component 116 unless otherwise noted. The plate 118 includes two fixed ends 120 and a central extension 122 configured to engage a valve seat 124 of the valve 110.

Figure 6B:
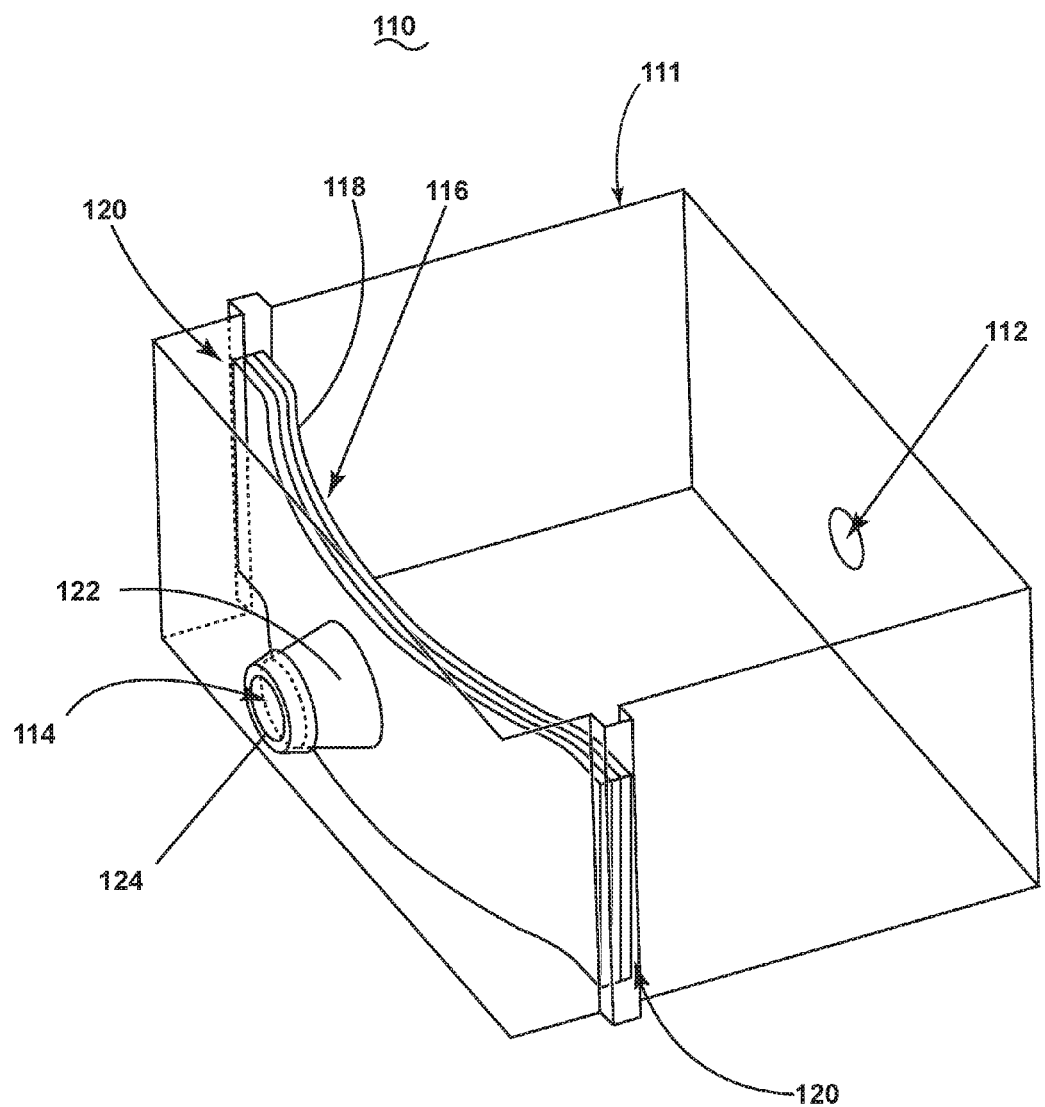
FIG. 6B is a perspective view of the exemplary valve of FIG. 6A where the valve is in a second position.

During operation, the actuation component 116 moves to a closed position in response to a predetermined temperature exerted thereon and to an open position in response to another predetermined temperature exerted thereon. The actuation component 116 moves between an opened position and a closed position (FIG. 6B), where the central extension 122 engages with the valve seat 124 and blocks the flow through the outlet port 114. In the illustrated embodiment, the plate 118 that curves or straightens in parallel to the temperature or pressure change, and provides for the opening or closing of the valve 110. In this manner, the plate can curve and straighten to control the flow of oil through the valve 110. It should be appreciated that the positions shown in FIGS. 6A and 6B are two exemplary positions, showing the maximum open and closed positions of the valve 110. However, it should be understood that a temperature between the two predetermined temperatures can position the valve in a partially curved position, such that the flow of oil is can only partially flow through the valve. As such, the actuation component can be adapted to deform along a temperature gradient to control the flow of oil along a range of temperatures.

Figure 7:
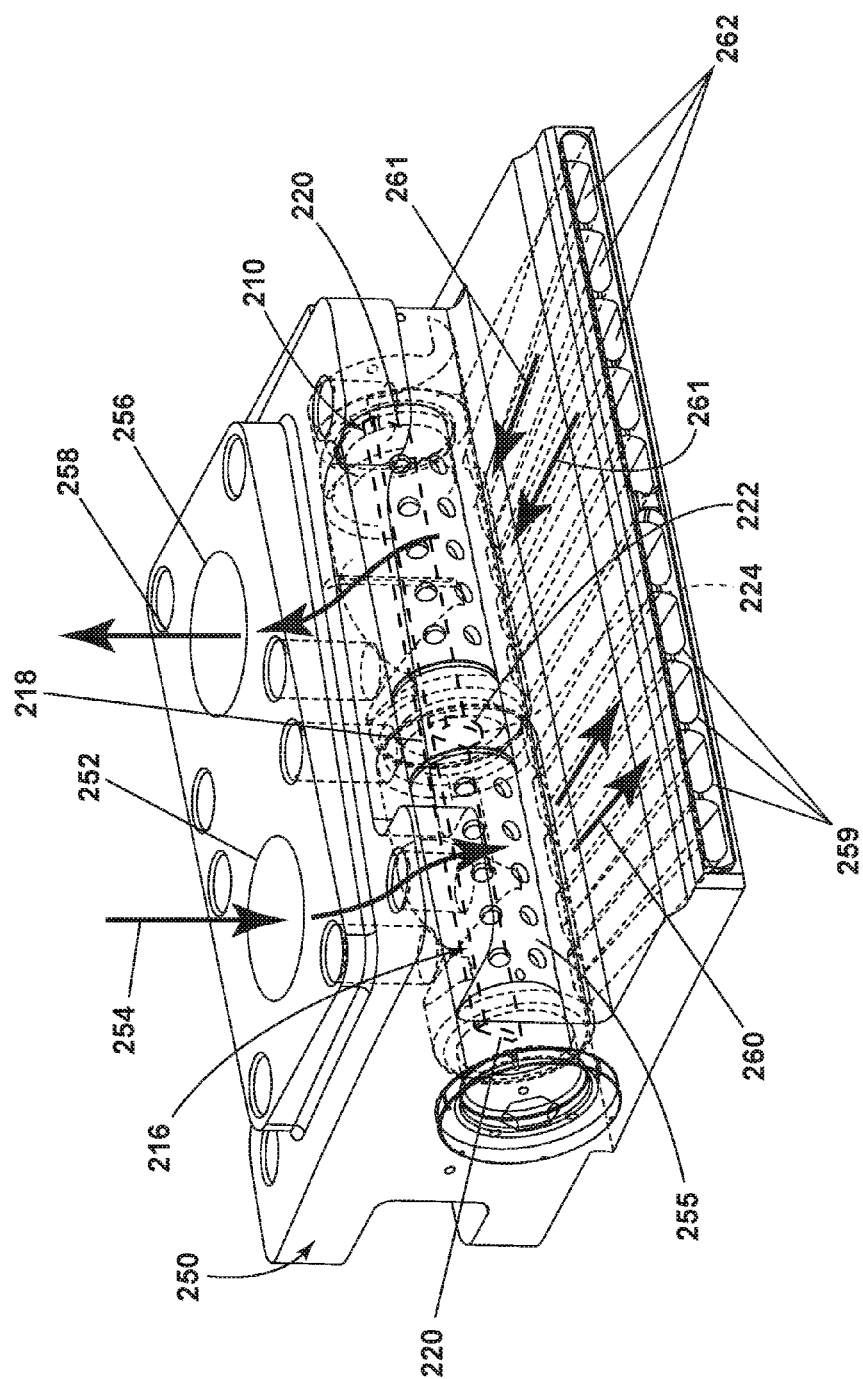
FIG. 7 is a perspective view of an exemplary manifold and valve that can be utilized in a surface cooler such as the surface cooler of FIG. 3.

FIG. 7 illustrates an alternative replaceable avionics bypass valve 210, such as an assembly cartridge, which can be utilized in the surface cooler 50. The avionics bypass valve 210 is similar to the valve 110 previously described and therefore, like parts will be identified with like numerals increased by 100, with it being understood that the description of the like parts of the valve 110 applies to the valve 210, unless otherwise noted.

One difference is that the valve 210 is illustrated in an exemplary manifold 250 for the surface cooler 50, which in turn integrates with the valve 210. More specifically, the manifold 250 is illustrated as having an inlet port 252 for hot engine oil, schematically designated with arrow 254, and an outlet port 256 for cold fluid, schematically designated as arrow 258. Inlet flow passages 259 are provided with a flow of hot engine oil from the inlet port 252 through the valve 210, designated by the arrows 260, where hot engine oil can be provided to the surface cooler 50 (FIG. 3) for cooling. Upon cooling the hot engine oil, the oil can be provided to return flow passages 262 with a flow of cooler oil designated by arrows 261. The cooled oil passes through the valve and exits the outlet port 256 illustrated by arrows 258. During cooling operation of the surface cooler 50 (FIG. 3) when the valve 210 is closed, the oil will be provided to the inlet flow passages 259 and is cooled by the surface cooler 50 confronting the flow of air through the fan casing assembly 38 (FIG. 1). After cooling, the cooler oil is returned to through the return flow passages 262.

The valve 210 includes port 212 fluidly coupled with the inlet port 252 of the manifold 250 and an outlet port 214 fluidly coupled with the outlet port 256 of the manifold 250. A bypass passage 255 connects the inlet port 252 and the outlet port 256. The bypass passage 255, when the valve 210 is open, directly fluidly couples the inlet port 252 to the outlet port 256. In the presence of a colder environment, or otherwise when the dissipation of heat from the hot engine oil 254 is not required, the valve 210 allows at least a portion of the hot engine oil 254 to bypass the surface cooler 50 and return to the engine 10 without being cooled by the surface cooler 50.

The valve 210 provides for flow control of the hot engine oil passing therethrough. The valve 210 includes an actuation component 216 including a plate 218 formed from a set of metal layers responsive to a change in at least one of a thermal condition and a pressure exerted thereon. In the illustrated example, the plate 218 is composed of two different materials similarly to the actuation component 92. The plate 218 includes two fixed ends 220 and a central extension 222 configured to engage a valve seat 224 of the valve body 210.

Figure 8A:
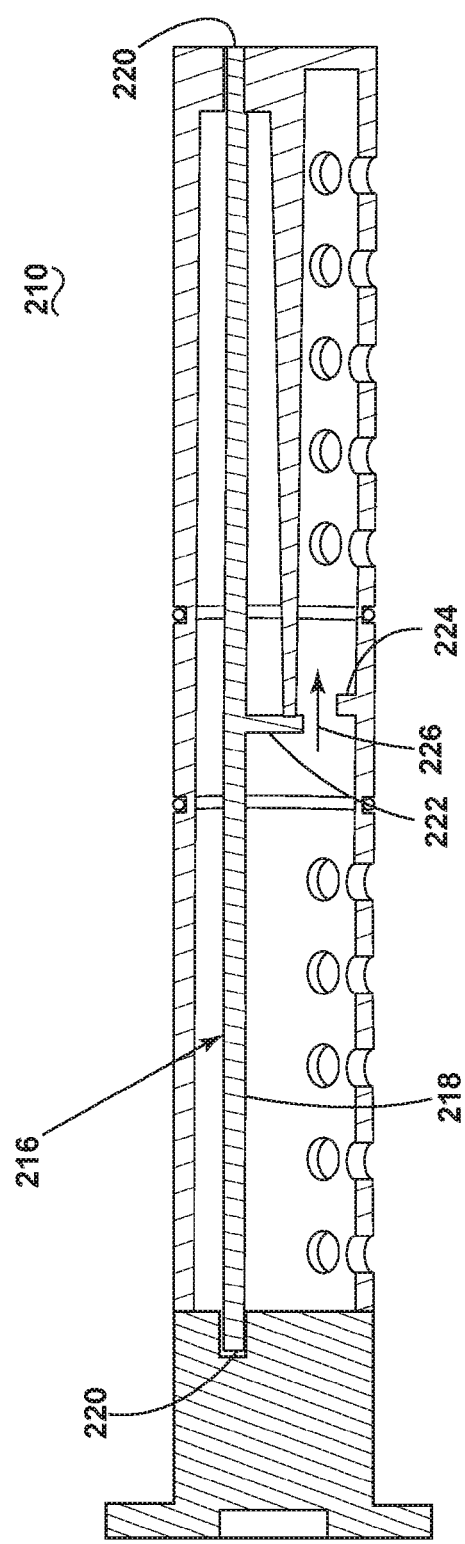
FIG. 8A is a cross-sectional view of the valve of FIG. 7 in a first, standard operational position.
Figure 8B:
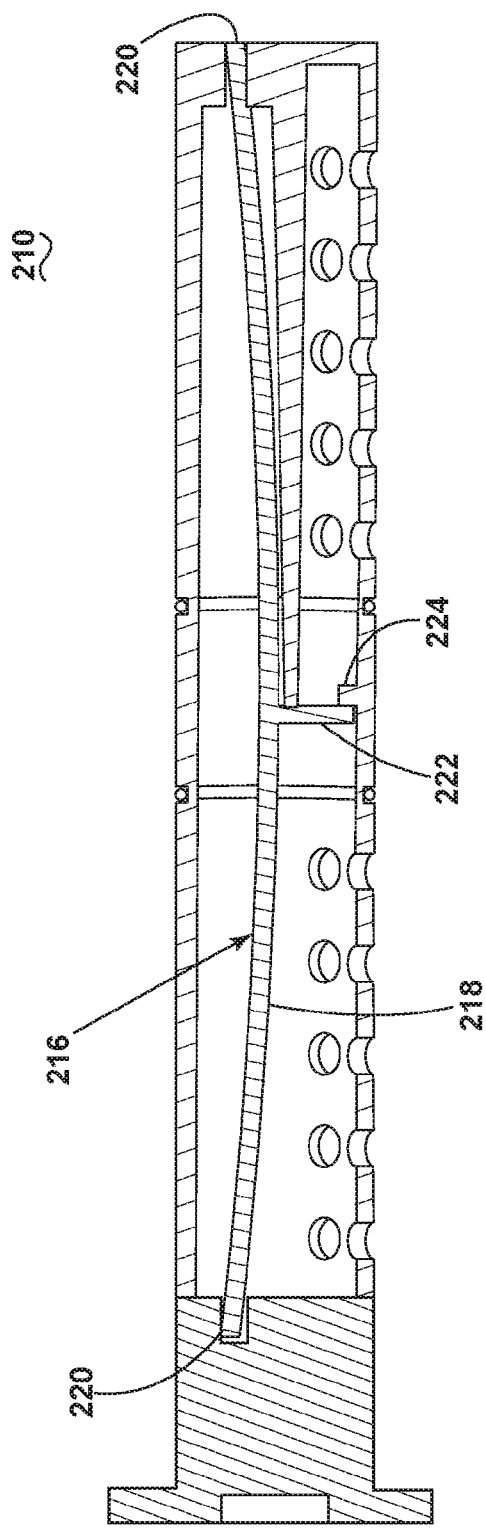
FIG. 8B is a cross-sectional view of the valve of FIG. 7 in a second, bypass position.

During operation of the valve 210, the actuation component 216 moves between an opened position (FIG. 8A) and a closed position (FIG. 8B), where the central extension 222 engages with the valve seat 224 and blocks a flow 226 (FIG. 8A) through the outlet port 214 (FIG. 7). More specifically, when the surrounding environment is of temperature that does not require cooling of the hot engine oil 254, the plate 218 is in the open position (FIG. 8A) to direct the hot engine oil 254 through the bypass valve 210 and thereby bypassing the surface cooler 50 (FIG. 2). Conversely, when the surrounding environment is of a predetermined temperature the plate 218 deforms to a curved position such that the valve 210 is in a closed position (FIG. 8B). Deformation as shown in FIG. 8B closes the valve 210 to direct the hot engine oil through the surface cooler 50 (FIG. 2), cooling the hot engine oil. In this manner, the valve 210 is configured to provide a bypass for at least a portion of a hot engine oil directed toward the surface cooler 50.

While the disclosure thus far has focused on the actuation component moving with temperature changes it will also be understood that the valve can also or alternatively be responsive to a change in pressure.

Figure 9A:
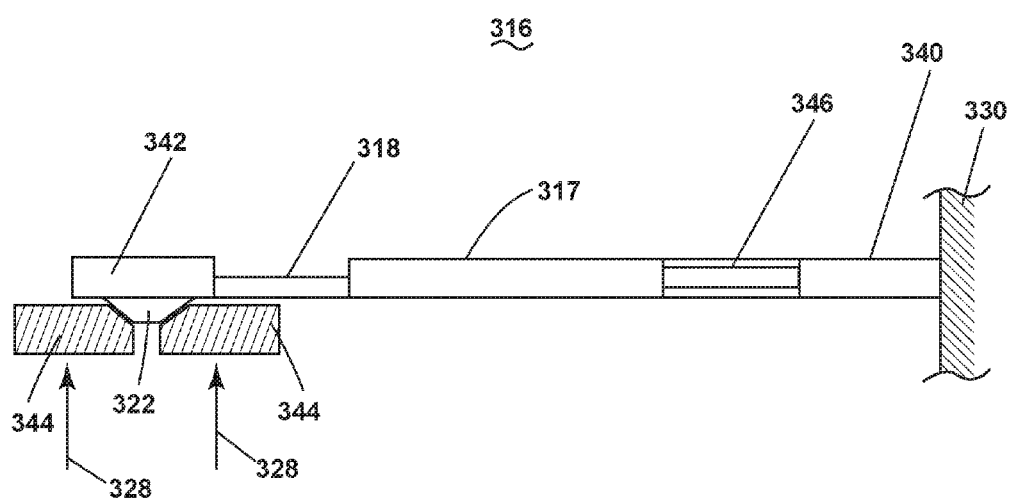
FIG. 9A is a schematic view of a heat or pressure activated actuation component that can be utilized in a valve in a surface cooler such as the surface cooler of FIG. 3.

FIG. 9A illustrates a valve as an actuation component 316 including a body 317 coupled to a temperature-actuated plate 318. The temperature-actuated plate 318 can be the actuator 92 of FIG. 4, for example, made of AlSiC. The temperature-actuated plate 318 can move in parallel to the temperature change. The plate 318 couples to a valve member 342 having a disc 322. A valve seat 344 is aligned with the disc 322 for opening or closing the actuation component 316. It should be appreciated that the disc 322, or any disc described herein, is not limited to an annular or circular shape, but should be considered as an element received in the seat 344 to open or close the valve, having any such geometry as is appropriate for reception at the seat 344. A flow of oil 328 is provided to the actuation component 316, where the actuation component operates as the valve to permit the flow of oil 328 through the seat 344. As shown in FIG. 9A, the actuation component 316 is in the closed position, preventing the flow of oil 328 through the seats 344.

Additionally, the actuation component 316 includes a pressure-actuated plate 346, which can actuate in parallel to the pressure change against the actuation component 316. The pressure-actuated plate 346 can be the actuator 92 of FIG. 4, for example, made of AlSiC similar to that of the temperature-actuated plate 318. A fixed end 340 couples the pressure-actuated plate 346 to a wall or structure 330 for fixing the actuation component and forming the valve.

It should be appreciated that the actuation component 316 as illustrated in FIG. 9A should not be limited by the geometry or organization of elements, but understood as including both a temperature and pressure actuated element for opening and closing a valve.

Figure 9B:
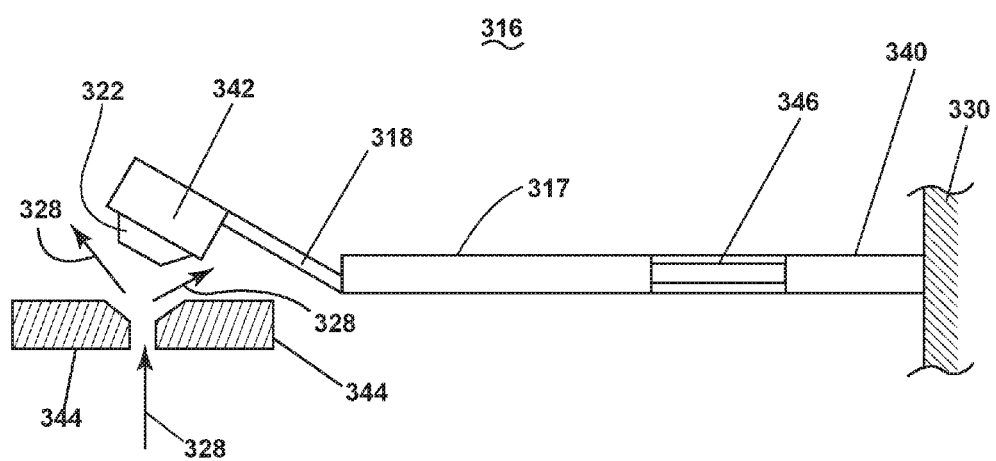
FIG. 9B is a schematic view of a low-pressure, heat activated actuation component utilized in a valve in a surface cooler such as the surface cooler of FIG. 3.

Referring now to FIG. 9B, a change in temperature, such as a temperature increase, can translate the temperature-actuated plate 318 to an opened position. In the opened position, the plate 318 curves or translates, moving the valve member 342 to remove the disc 322 from the seat 344 to open the valve. As such, the flow of oil 328 flows through the seat 344 and through the actuation component 316. For example, an increase in temperature causes opening of the actuation component 316 to permit the flow of heated oil 328 for cooling with the surface cooler 50 (FIG. 1).

Figure 9C:
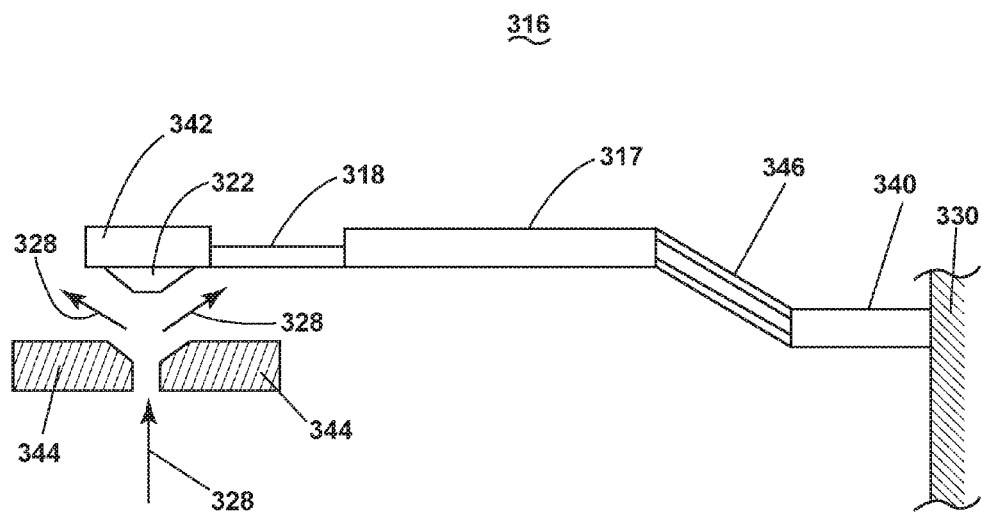
FIG. 9C is a schematic view of a high-pressure actuation component that can be utilized in a valve in a surface cooler such as the surface cooler of FIG. 3.

Referring now to FIG. 9C, the pressure-actuated plate 346, or system of plates 346 moved due to a change in pressure, opening the disc 322 from the seat 344. As such, the body 317 and the temperature-actuated plate 318 have been translated upwardly to open the valve by moving the valve member 342 from the seat 342 to permit the flow of oil 328 through the valve.

It will be understood that the plates 318, 346 have only been shown schematically and that the entirety of the plates 318, 346 or a sub-portion of the plates 318, 346 can be formed from a set of metal layers and responsive to a change in at least one of a thermal condition or a pressure exerted thereon such that the plates 318, 346 move and the valve moves between an opened and a closed position where a portion of the plate 318 engages with a corresponding valve seat 342.

It should be further understood that the plates 318, 346 should not be limited to operation through changes in temperature and pressure as described. The plates 318, 346 can be operated through changes in pressure or temperature, or a combination thereof. Thus, it should be appreciated that the actuation component 316 is sensitive to both changes in pressure and temperature to open and close the valve.

Figure 9D:
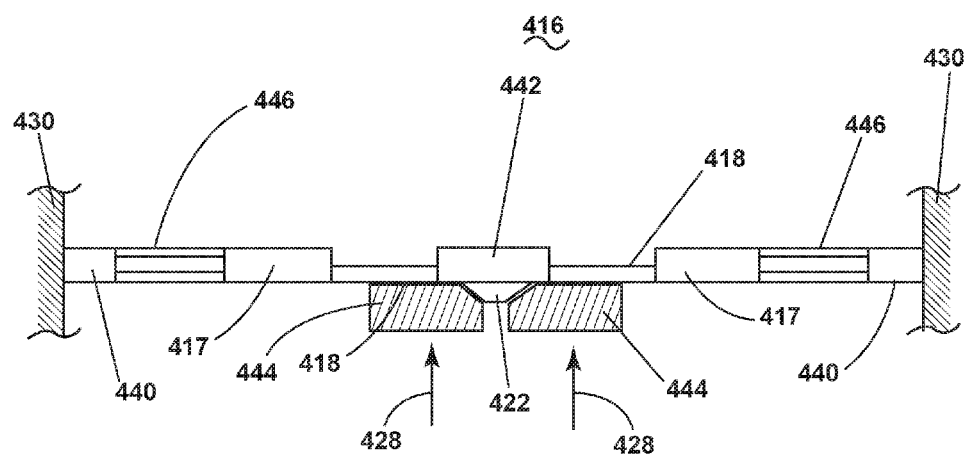
FIG. 9D is a schematic view of an extended actuation component sensitive to both temperature and pressure.

FIG. 9D illustrates a temperature and pressure sensitive actuation component 416 including a system of plates 418, 446 that curves, straightens, or translates in parallel to the temperature or pressure change, or both, and can also provide for the opening or closing of a valve. The actuation component 416 and plates 418, 446 are similar to the actuation component 316 and plates 318, 346 previously described in FIGS. 9A-9C and therefore, like parts will be identified with like numerals increased by 100, with it being understood that the description of the like parts applies unless otherwise noted.

As illustrated, the actuation component 416 is doubled-sided, providing for an increased potential flow and pressure of oil 428. As such, both sides can be translated about the plates 418, 446 to provide for a larger flow rate through the seat 444, or around the sides of the seat 444. The double-sided actuation component 416 can also provide greater sensitivity to changes in temperature and pressure to provide for a more deterministic change in flow based upon the changes in temperature and pressure.

While FIGS. 9A-9D are illustrated as moving in a two-dimensional plane, it should be understood that three-dimensional kinematic mechanisms are possible with planar and out of plane translational and rotational degrees of freedom. Advanced MMC and SMA materials, currently available in the form of metal tapes and advanced ultrasonic welding with in-situ machining are available to develop such materials.

FIGS. 10A-10D, illustrate yet another actuation component 516 that can move with respect to a temperature or pressure change, and can also provide for the opening or closing of a valve body so as to control the flow of oil through the valve 110. It will be understood that the actuation component 516 operates similarly to those described above in FIGS. 9A-9D and that similar numerals will be used to describe similar elements increased by a value of two-hundred for 300-series numerals or by a value of one-hundred for 400-series numerals.

Figure 10A:
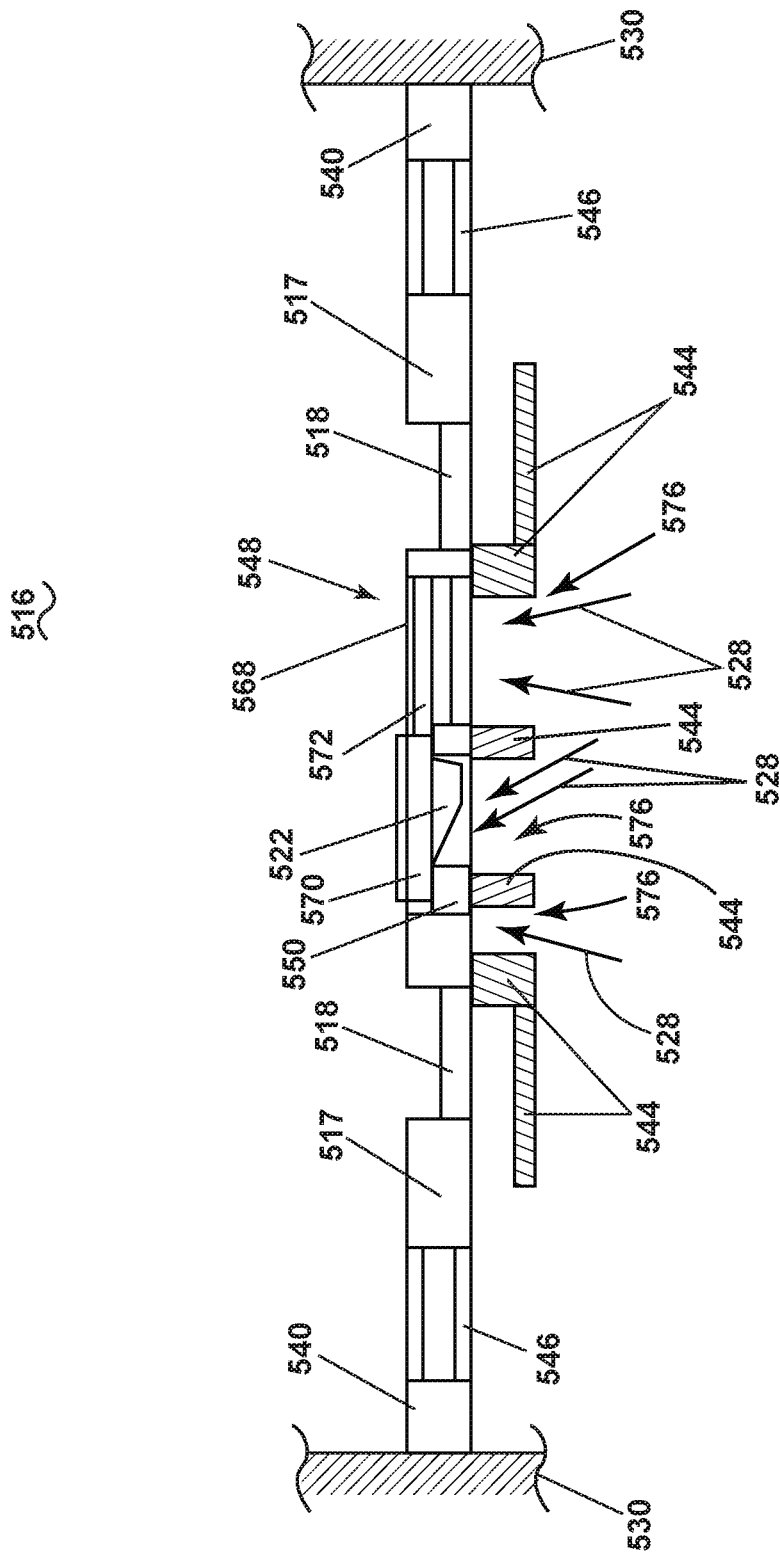
FIG. 10A is a schematic view of a bi-modal temperature and pressure actuation component that can be utilized in a valve in a surface cooler such as the surface cooler of FIG. 3 where the actuation component is in an initial position.

In FIG. 10A, the actuation component 516, shown in a first, closed position, comprises two temperature-actuated plates 518 coupled to a secondary temperature-controlled portion 548. The secondary temperature-controlled portion 548 includes a cavity 568 with a secondary plate 570 coupled to an arm 572. The secondary plate 570 includes a disc 522, adapted to be received in a second seat 550 within the secondary temperature-controlled portion 548. In this manner, the actuation component 516 allows bi-modal, temperature-activated flows, or flows at different modes or environments. The remainder of the actuation component 516 can be substantially similar to that of FIG. 9D, having two sides with each side including the temperature-actuated plates 518 and pressure actuated plates 546.

Figure 10B:
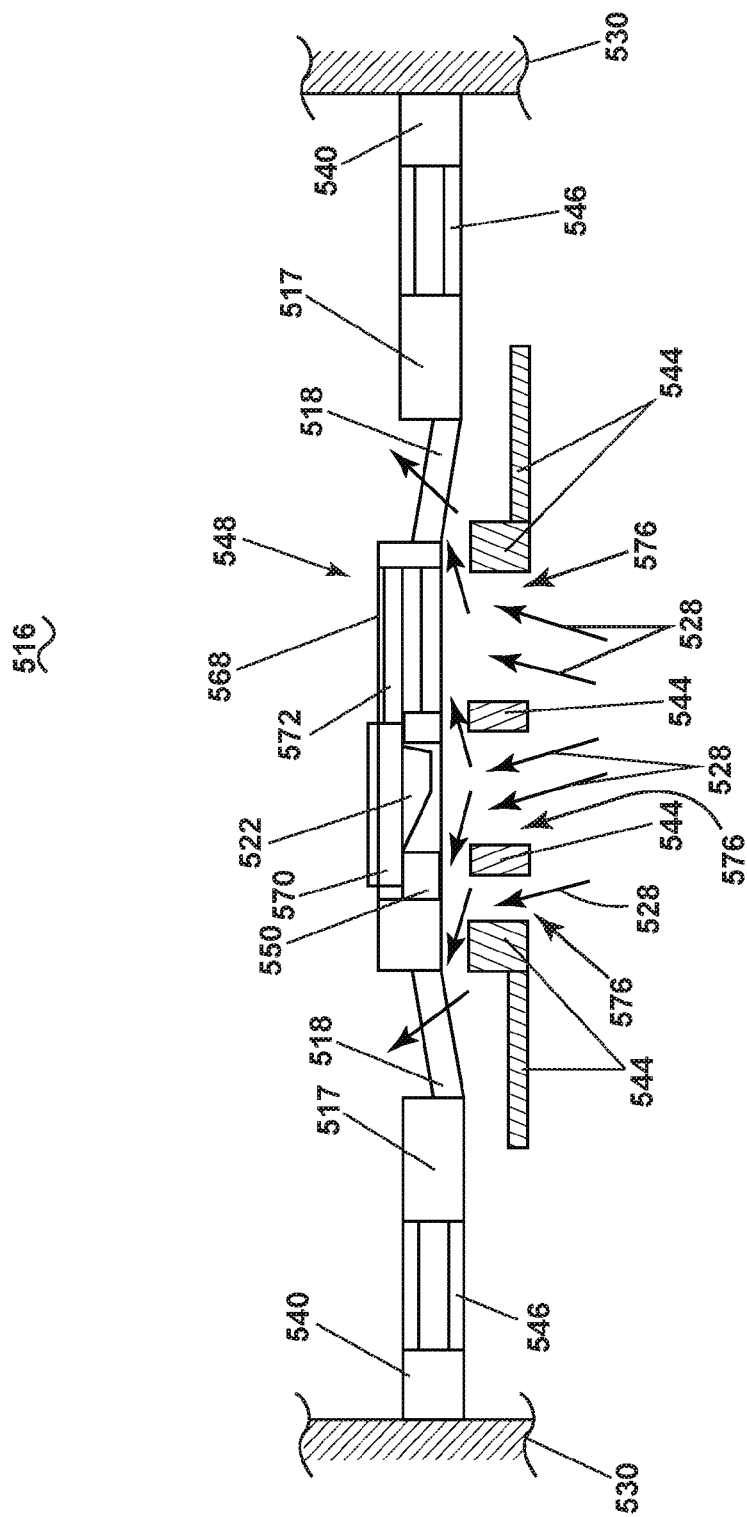
FIG. 10B is a schematic view of the first-mode temperature actuation component of FIG. 10B where the actuation component is in a second position.

In FIG. 10B the actuation component 516 is in a second, opened position. The temperature-actuated plates 518 translate upwardly, permitting multiple flow ports 576 to open at the seats 544, permitting the flow of oil 528 through the valve and actuation component 516. In this position, the secondary temperature-controlled portion 548 remains closed, as well as the pressure-actuated plates 546.

Figure 10C:
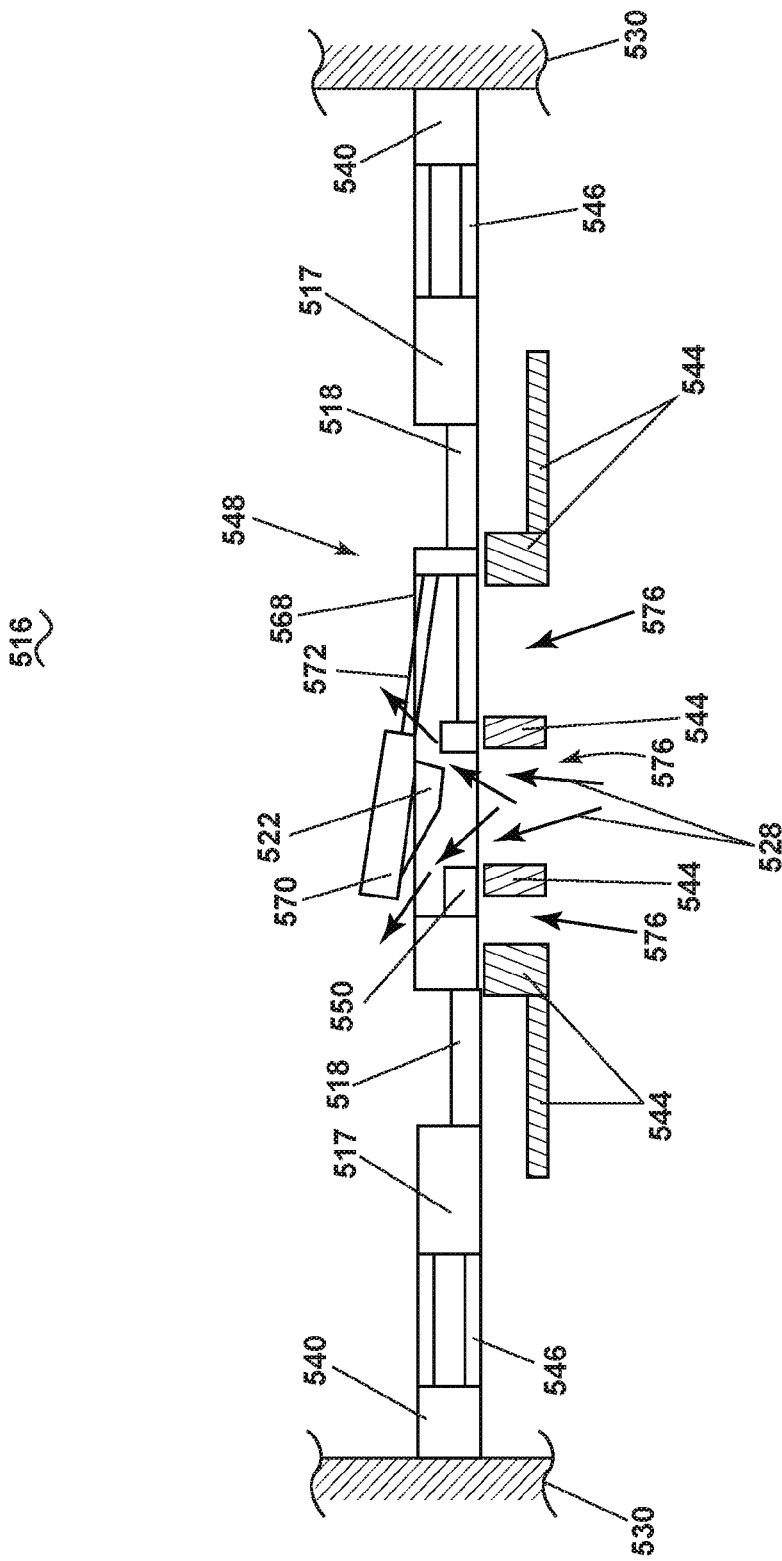
FIG. 10C is a schematic view of the second-mode temperature actuation component of FIG. 10B where the actuation component is in a third position.

FIG. 10C is a schematic view of the actuation component 516 of FIG. 10A in a third, opened position, having the secondary temperature-controlled portion 548 translated to remove the disc 574 from the second seat 550. The arm 572 includes and is supported by the thermal activation bi-metal or multiple laminate flapper plates such as that illustrated and described in reference to FIG. 4. In the third, opened position, the arm 572 translates to permit the flow of oil 528 to pass through the flow ports 576 through the secondary portion 548 alone. As such, the secondary temperature-controlled portion 548 can be tuned to discrete temperatures to provide a lesser flow rate as compared to actuation of the valve at the temperature-actuated plates 518.

Thus, it should be appreciated with FIGS. 10B and 10C that the plates 518 and arm 572 can be adapted to actuate at different temperatures to meter the flow of oil 528 based upon the temperature of the system. For example, as the secondary temperature-controlled portion 548 can permit a smaller amount of oil 528 to pass through, it can operate at a lower temperate than the plates 518, permitting a greater flow of oil 528 through the plates 518 at the higher temperature to provide increased cooling as necessary.

Figure 10D:
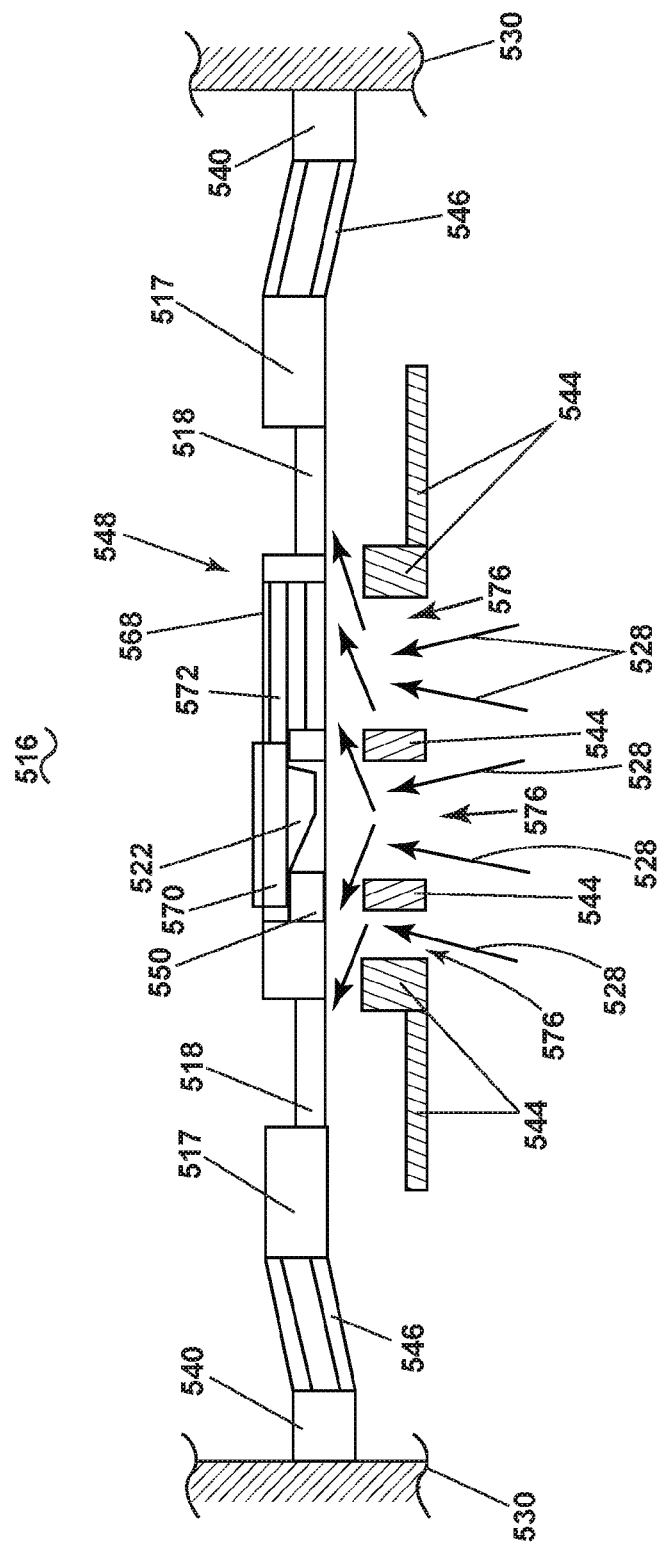
FIG. 10D is a schematic view of the pressure actuation component of FIG. 10A where the actuation component is in a fourth position.

FIG. 10D is a schematic view of the actuation component 516 of FIG. 10A where the actuation component is in a fourth, opened position based upon a pressure to open the pressure-actuated plates 546. In the fourth, opened position, the pressure-actuated plates 546 have been translated to open the flow ports 576 to permit a volume of oil 528 to pass through the actuation component 516 based upon the current pressure.

Thus, it should be appreciated that the actuation component 516 as illustrated in FIGS. 10A-10D provides for opening the valve in three separate positions, as shown in FIGS. 10B-10D. Thus, the valve can be tuned to provide different or bi-modal flow rates of oil 528 through the actuation component 516 temperature as well as for a change in pressure. It should be understood that while the four separate positions are shown individually in FIGS. 10A-10D, the positions can be combined based upon the temperature and pressure at the actuation component 516. For example, a heightened temperature can open both the temperature-actuated plates 518 and the secondary temperature-controlled portion 548 to permit increased flow of oil 528 through the flow ports 576. In yet another example, the temperature and pressure can be heightened to open both the temperature-actuated plates 518 and the pressure actuated plates 546 to permit an increased flow of oil 528 through the flow ports 576. It should be appreciated that this is described by way of example only, and that any combination of the positions shown in FIGS. 10A-10D is contemplated.

Similar to that of FIGS. 9A-9C, the actuation component 516 of FIGS. 10A-10D can actuate in three-dimensional space, such as out-of-plane, or a combination of in-plane and out-of-plane. It is contemplated that the reduction of hydraulic loss across the valve can be improved with custom poppet and seat geometries and orientations. Such geometries and orientations can be designed to reduce overall size, complexity, mass, and assembly processing.

Additionally, it should be appreciated that any of the assemblies, valves or components as described herein can be provided in a replaceable cartridge assembly. Such a cartridge assembly can facilitate simplicity of replacement or servicing, as well as retrofitting existing assemblies. Such a cartridge assembly can reduce overall cost associated with installation, servicing, as well as manufacture as compared to current valve systems.

The above disclosure provides for a compact and simplified design that functions of thermal and hydraulic fluid control of temperature and pressure in a low profile, low-mass, simplified, one-piece design. The above described actuation component provides a closed loop control from temperature or pressure of the fluid or environment. The above-described valves are inexpensive to manufacture, weighs less than prior art by-pass valves, is reliable, and does not require an external source of energy in passive mode. In addition, the above-described valves do not require the use of a wax so no issues with leakage or sealing of components exist. Reliability is also improved with the simplification from a complex multi-component assembly with a large number of precisely aligned welds to a single piece design. This integrated actuation design, improves the thermal response of the cooler to changing load conditions by reducing the transient delay and maximizing the thermal magnitude of actuation. Furthermore, the simplified design reduces the opportunity for manufacture defects or long-term failures, reducing the required rework, thus reducing cost. Additionally, the low profile and low mass are important to reduce airflow, drag, and overall fuel consumption.

The foregoing has described a heat exchanger apparatus comprising an air-cooled oil cooler bypass valve. While the present disclosure has been described with respect to a limited number of embodiments, those skilled in the art, having benefit of this disclosure, will appreciate that other embodiments can be devised which do not depart from the scope of the disclosure as described herein. While the present disclosure has been described with reference to exemplary embodiments, it will be understood by those skilled in the art that various changes can be made and equivalents can be substituted for elements thereof without departing from the scope of the disclosure. In addition, many modifications can be made to adapt a particular situation or material to the teachings of the present disclosure without departing from the essential scope thereof. For example, the bypass valve described herein can be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the bypass valve disclosed herein will work equally well with other types of air-cooled oil coolers, and as such is not intended to be limited to surface coolers, and can be configured for use in other cooler types, such as plate and fin, tube-fin types, or the like would benefit as well. Further still it will be understood that depending on the internal passage geometry of the valve and the inlet port and outlet port orientations, the flow through the valve can be in-plane (i.e. traverse) or out-of-plane (i.e. axial). Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A valve, comprising:
   a valve seat;
   a valve body spaced from the valve seat in an opened position and seating at the valve seat in a closed position; and
   an actuation component operably coupled to the valve body to actuate the valve body, and including a plate formed from a set of metal layers actuable via a change in at least one of a thermal condition and a pressure exerted thereon, such that the actuation component moves the valve body between the opened position and the closed position, and the plate bends to have a curved shape;
   wherein the valve is incorporated in a heat exchanger which comprises an air-cooled oil cooler for a turbine engine.

2. The valve of claim 1 wherein the plate is mounted to the valve body at a first end and a second end of the plate defines a free end.

3. The valve of claim 2 wherein the plate comprises an extension at its free end that is configured to engage with the valve seat of the valve body.

4. The valve of claim 3 wherein the plate is configured to move the extension to the closed position in response to a predetermined temperature exerted thereon.

5. The valve of claim 1 wherein the plate includes a monolithic composite metal sheet.

6. The valve of claim 1 wherein the plate includes a bi-metal strip comprising a layer of aluminum alloy and a layer of aluminum silicon carbide.

7. The valve of claim 6 wherein the coefficient of thermal expansion for the layer of aluminum silicon carbide ranges from 20 ppm/C to 7 ppm/C.

8. The valve of claim 1 wherein the plate comprises two fixed ends and a central extension configured to engage the valve seat of the valve body.

9. The valve of claim 1 wherein the plate further comprises a secondary temperature controlled portion that is configured to allow bi-modal flows.

10. The valve of claim 1 wherein the valve is part of a cartridge assembly to retrofit existing valve systems.

11. A heat exchanger apparatus for use in an oil cooling system of an aircraft engine comprising:
an air-cooled oil cooler disposed in a bypass fan duct of the aircraft engine; and
a valve, in fluid communication with the air-cooled oil cooler, the valve comprising:
a valve seat;
a valve body actuable to close the valve at the valve seat; and
an actuation component including a set of metal layers and bendable from a planar plate to a curved plate in response to a change in a thermal condition and a pressure exerted thereon such that the actuation component moves the valve body between an opened position where the valve body is spaced from the valve seat and a closed position where the curved plate engages with the valve seat.

12. The heat exchanger apparatus of claim 11 wherein the actuation component is configured to move to the closed position in response to a predetermined temperature exerted thereon and to the opened position in response to the predetermined temperature exerted thereon.

13. The heat exchanger apparatus of claim 11 wherein the actuation component is mounted to the valve body at a first end and a second end of the plate defines a free end.

14. The heat exchanger apparatus of claim 11 wherein the actuation component includes a strip with the set of metal layers.

15. The heat exchanger apparatus of claim 11 wherein the actuation component comprises two fixed ends and a central extension configured to engage the valve seat of the valve body.

16. The heat exchanger apparatus of claim 11 wherein the valve is configured to provide a bypass for at least a portion of a hot engine oil directed toward the air-cooled oil cooler and direct the portion of the hot engine oil back to an engine core prior to reaching the air-cooled oil cooler.

17. A turbine engine, comprising:
a core engine; and
a heat exchanger apparatus comprising:
an air-cooled oil cooler disposed in a bypass fan duct of the turbine engine; and
a bypass valve, in fluid communication with the air-cooled oil cooler, the bypass valve comprising:
a valve body seatable at a valve seat; and
an actuation component including a plate formed from a set of metal layers and responsive to a change in a thermal condition and a pressure exerted thereon such that the plate curves and the valve body moves from an opened position to a closed position where the curvature of the plate causes the valve body to engage with the valve seat in the closed position; and
wherein the valve body is configured to provide a bypass for at least a portion of a hot engine oil directed toward the air-cooled oil cooler and direct the portion of the hot engine oil back to the core engine prior to reaching the air-cooled oil cooler.

18. The turbine engine of claim 17 wherein the plate is a strip formed from the set of metal layers.

19. The turbine engine of claim 17 wherein the plate curves and straightens based on thermal conditions.

* * * * *